Nov. 6, 1951  G. A. STANLEY  2,574,069
APPARATUS FOR CLEANSING DRINKING VESSELS AND THE LIKE
Filed Dec. 27, 1948  3 Sheets-Sheet 1

Inventor
G. A. Stanley
By Glascock Downing Pickle
Attys.

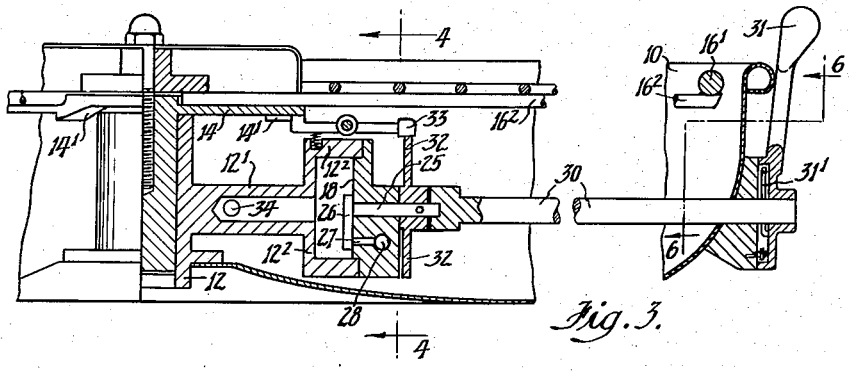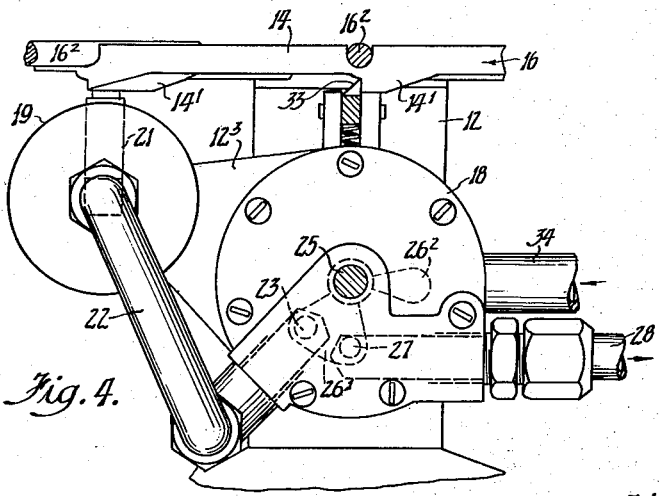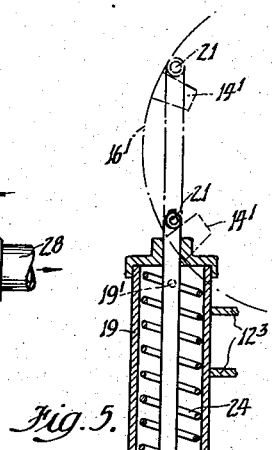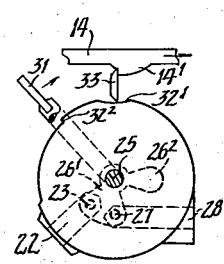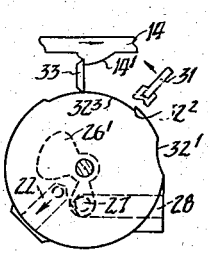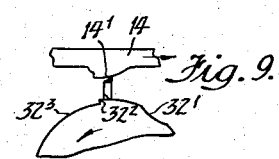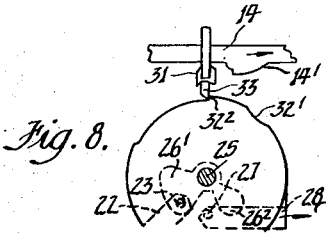

Nov. 6, 1951 G. A. STANLEY 2,574,069
APPARATUS FOR CLEANSING DRINKING VESSELS AND THE LIKE
Filed Dec. 27, 1948 3 Sheets-Sheet 3
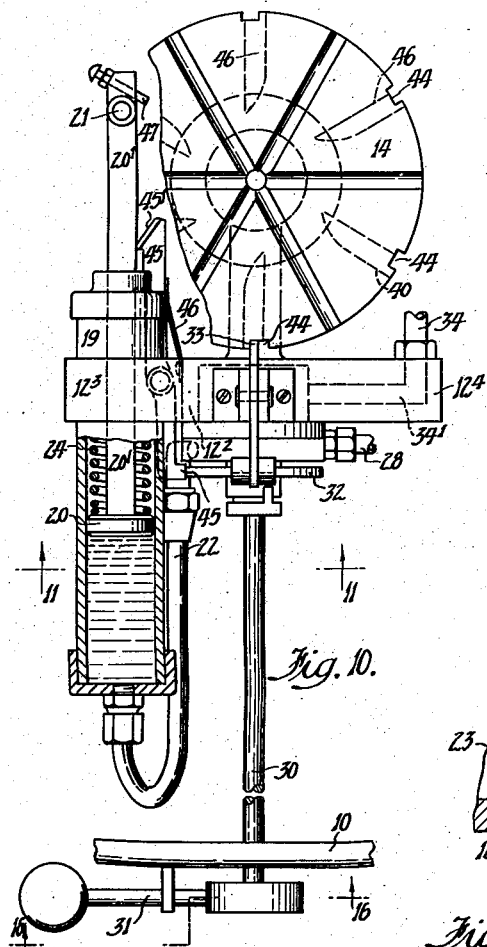
Fig. 10.
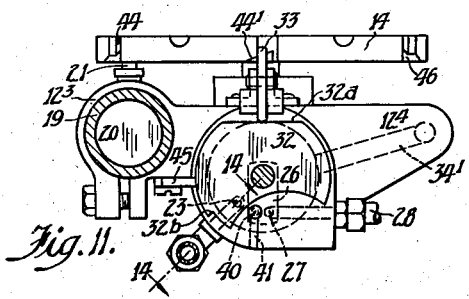
Fig. 11.
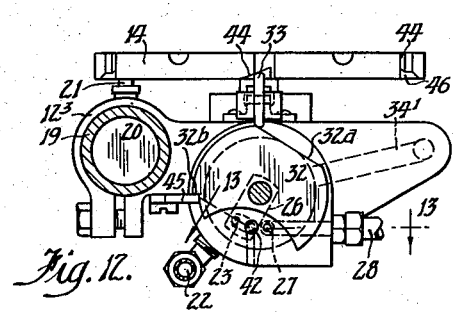
Fig. 12.
Fig. 14. Fig. 15.
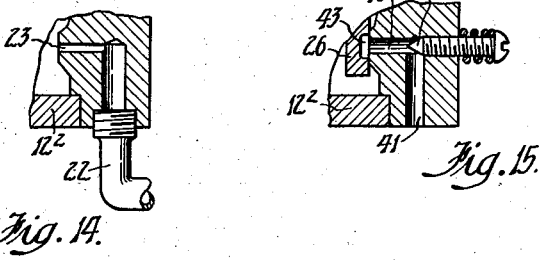
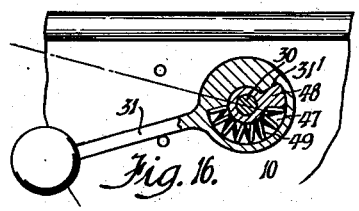
Fig. 16.
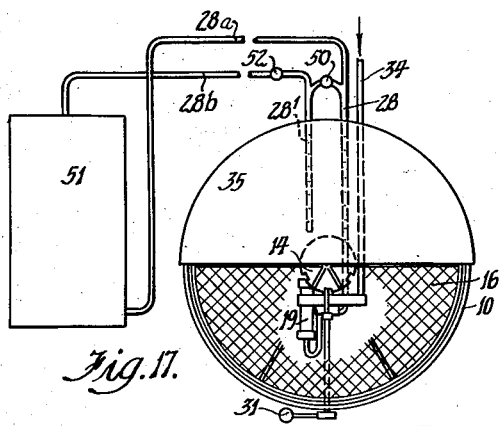
Fig. 17.
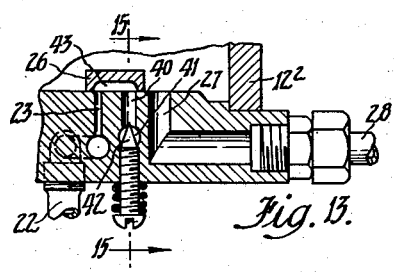
Fig. 13.
Inventor
G. A. Stanley Patented Nov. 6, 1951

2,574,069

UNITED STATES PATENT OFFICE 2,574,069

APPARATUS FOR CLEANSING DRINKING VESSELS AND THE LIKE

Gerald Arthur Stanley, Oakleigh, Victoria, Australia; Evelyn Maud Stanley executrix of said Gerald Arthur Stanley, deceased Application December 27, 1948, Serial No. 67,307
In Australia January 12, 1948

15 Claims. (Cl. 134—141)

1

This invention relates to apparatus for cleansing drinking glasses and the like and its object is to provide simple and improved apparatus suitable for use in hotel bars and the like and by means of which such vessels may be cleansed effectively and expeditiously.

Apparatus in accordance with the invention broadly comprises a table of openwork construction supported for rotation about a substantially vertical axis and adapted to support a plurality of inverted drinking glasses, upwardly directed spray means arranged below said table between loading and unloading stations thereof and means operable manually to impart intermittent angular movements to said table.

Preferably the table is actuated by a reciprocable hydraulic motor and a salient feature thereof resides in the provision of a single-acting hydraulic motor arranged to operate energy storing means such as a spring, said energy storing means being arranged to actuate said table.

Another important feature of the invention resides in the provision of control means adapted at each actuation thereof to cause the table and spray means to undergo one complete cycle of operations.

The said table is preferably arranged within a shallow dished tray provided with means for discharging waste liquid therefrom.

The invention also includes valve and other mechanism as hereafter described.

Figure 1:
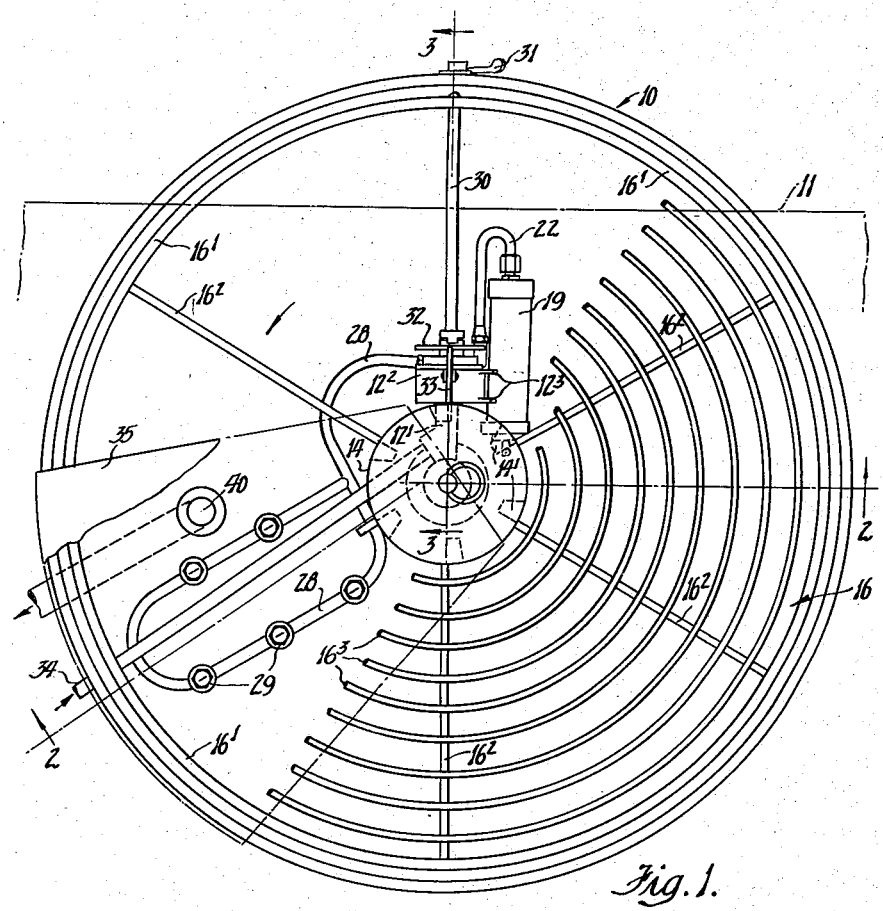
Figure 2:
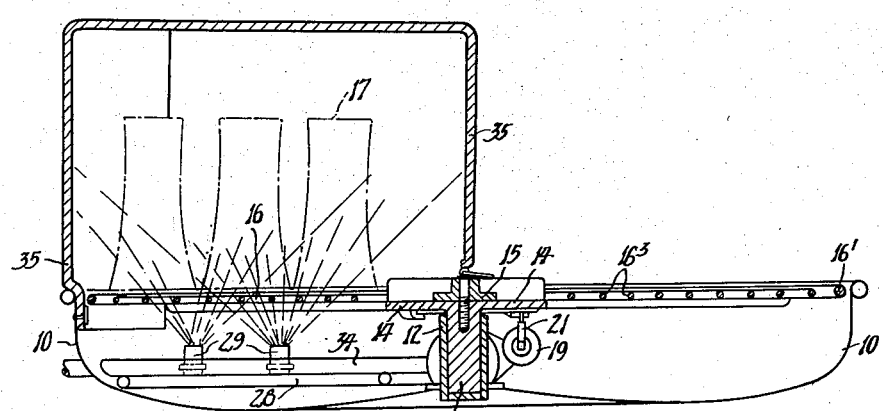

For a more particular description of a preferred embodiment of the invention reference will be made to the accompanying drawings in which:

Figure 1 is a view in plan of the one construction of cleansing apparatus according to the invention, Figure 2 is a view in sectional elevation taken on the line 2—2 of Figure 1, Figure 3 is a view in sectional elevation to a larger scale and is taken on the line 3—3 of Figure 1, Figure 4 is a view in sectional end elevation and is taken on the line 4—4 of Figure 3, Figure 5 is a view in sectional plan of a hydraulic actuating cylinder, Figure 6 is a view in sectional end elevation taken on the line 6—6 of Figure 3 and shows the normal position of the control valve mechanism, Figures 7 and 8 are views similar to Figure 6 and show the valve in different operating positions, Figure 9 is a view corresponding to Figures 6, 7 and 8 and shows the operation of a trip device, Figure 10 is a view in plan and partly in section of modified actuating apparatus, Figure 11 is a view in sectional end elevation taken on the line 11—11 of Figure 10,

2

Figure 12 is a view similar to Figure 11 and shows another stage in the operation of the apparatus, Figure 13 is a view in sectional plan on the line 13—13 of Figure 12, Figures 14 and 15 are sectional views on the lines 14—14 and 15—15 of Figures 11 and 13 respectively, Figure 16 is a view in sectional elevation taken on the line 16—16 of Figure 10, and Figure 17 is a view in plan of the glass washing machine showing a modified arrangement of the spray means.

In the several figures of the drawings the same reference numerals are used to designate the same or corresponding parts and the apparatus shown in Figures 1 to 9 inclusive comprises a relatively shallow circular tray 10 formed of sheet metal and which may be arranged horizontally below a bar counter 11 whereby a portion of the periphery projects beyond the rear edge thereof as shown in Figure 1.

This tray is provided at the center with a casting 12 which forms a vertical bearing for a spindle 13 provided at its upper end with an integral disc 14 to which is clamped rigidly by a head member 15 the central portion of a circular horizontal table 16 arranged within the top of the tray 10.

The table 16 comprises a peripheral wire ring 16' a little smaller in diameter than the tray 10, a plurality of radial arms 16² and a plurality of intermediate concentric wire rings 16³ spaced as far apart as is consistent with their function of supporting inverted drinking glasses 17.

Alternatively the table 16 may be formed of square wire mesh or may be of any other suitable openwork construction.

The central casting 12 is formed with a radial projection 12' provided with an axial passage which communicates with a valve chamber 12³ in an enlargement of the free end of such projection, the outer end of the valve chamber being fitted with a detachable cover plate 18.

The free end of the projection 12' is also provided with lateral flanges 12³ to which is secured a cylinder 19 arranged horizontally below the table 16 with its axis disposed at an angle to the radius of the latter. This cylinder is fitted with a slidable loose fitting plunger 20 secured to a plunger rod 20' which projects through a bearing at the inner end of the cylinder, the free end of said plunger rod being provided with a spring loaded pawl 21 for engagement with a plurality of radial ratchet teeth 14' formed on the under surface of the disc 14. In the illustrated embodiment six ratchet teeth 14' are provided whereby as hereafter described the table 16 is turned through one sixth of a revolution at each actuation of the apparatus.

The outer end of the cylinder is connected by a pipe 22 to a port 23 in the inner face of the aforesaid cover plate 18 of the valve chamber while a compression spring 24 arranged within the cylinder on the opposite side of the plunger constantly urges the latter towards the outer end of the cylinder.

A valve spindle 25 extends centrally through a bearing in the cover plate 18 of the valve box and is provided at its inner end with a valve member generally designated 26 and comprising two angularly spaced wings 26' and $26^2$ respectively which, in order to obviate excessive frictional resistance to turning, are made as small in area as possible.

The inner face of the cover plate 18 of the valve body is formed with a second port 27 to which is connected one end of a pipe 28, the outer end portion of which forms a closed loop fitted with a plurality of upwardly directed spray jets 29.

The wider wing 26' of the valve 26 is of sufficient size to cover the ports 23 and 27 simultaneously, while the wing $26^2$ serves to close the port 27 only during the idle stroke of the plunger 20, as hereafter described.

The valve spindle 25 is coupled to a coaxially arranged operating spindle 30 which extends through the peripheral wall of the tray and is fitted with an operating arm 31 which is continually urged towards its inoperative position shown in Figure 6 by a torsion spring 31' shown in Figure 1.

The valve spindle 25 is fitted with a disc cam 32, the periphery of which is engaged by one end of a retaining pawl 33 pivoted intermediate its ends to a lug on the wall of the valve chamber, the opposite end of said pawl being bent upwards to engage the radial ratchet teeth 14' on the center disc 14 of the rotatable table.

The function of this pawl and the shape of the cam 32 are explained in the ensuing description of the operation of the apparatus.

The cleansing fluid which may for example be hot or cold water, is supplied under pressure to the valve chamber $12^2$ through a pipe 34 which extends inwardly through the peripheral wall of the tray 10 and communicates with the central passage in the radial projection 12'. Thus the valve chamber is normally filled with water under pressure and the wings 26' and $26^2$ of the valve member are maintained thereby in sealing contact with the inner face of the cover plate 18 of the valve body.

A detachable splash guard 35 is arranged above the table 16 in alignment with the spray jets 29 below the latter, the outer wall of said guard being detachably connected to the rim of the tray 10 as shown in Figure 2, while the inner wall rests on the center of the table as shown in the same figure.

In use the glasses 17 to be cleaned are inverted and placed on the table 16 somewhat in advance of the sprays 29 and splash guard 35.

At this time the operating arm 31 and the valve 26 are disposed in the positions shown in Figure 6 so that the valve ports 23 and 27 are both closed by the wider wing 26' of the valve.

At this stage the inner end of the retaining pawl 33 is disposed behind the following face of one of the ratchet teeth 14' as shown in Figure 6, while the outer end thereof is in register with a clearance recess 32' in the edge of the cam 32 as shown in the same figure.

Also at this stage the plunger and plunger rod 20' are disposed in their normal outermost positions and the pawl 21 on the inner end of the plunger rod is disposed behind the following face of one of the ratchet teeth 14' as indicated in Figure 5.

When a batch of glasses 17 has been placed in the described position on the table 16 the operating arm 31 is moved manually in a clockwise direction to the position in which it is shown in Figure 7, further movement in this direction being arrested by an associated stop on the rim of the tray 10.

The valve 26 and the cam 32 participate in this movement whereby the valve wing 26' is moved clear of the ports 23 and 27 while the valve wing $26^2$ is moved into position to again close the port 27.

The said movement of the cam 32 causes the outer end of the pawl 33 to be elevated to pass a radial shoulder $32^2$ and then to enter a second clearance recess $32^3$ in the edge of the cam but this pawl movement is without effect at this time. Thus as the cylinder port 23 is now open, water under pressure passes through the pipe 22 to the outer end of the cylinder 19 and forces the plunger inwardly to its full extent against the action of the spring 24. This movement of the plunger rod carries the driving pawl 21 beyond the next succeeding ratchet tooth 14' as also indicated in Figure 5 but is an idle stroke, insofar as movement of the table 16 is concerned.

The operating arm 31 is held in the described operated position only for the short time required for the plunger to move inwards and compress the spring 24 and is then released whereupon it is moved in the reverse direction by its associated spring 31'. This return movement is arrested at an intermediate position when the shoulder $32^2$ on the cam engages the outer end of the retaining pawl 33 as shown in Figure 8. This partial return movement causes the wing 26' of the valve member to uncover the port 27 and the wing $26^2$ to cover the port 23 so that the fluid pressure within the cylinder is relieved.

The spring 24 then returns the plunger 20 to the outer end of the cylinder by forcing the water in the latter past the plunger so that it is discharged through an exhaust port 19' in the inner end of the cylinder. Thus the return movement of the plunger is controlled by the rate at which the water can escape from the cylinder around the plunger.

During this return movement the table 16 with the glasses 17 thereon is advanced through one sixth of a turn and this movement suffices to carry the glasses into and through the splash guard 35.

As above described the port 27 is uncovered by the partial return movement of the valve 26 so that as the table undergoes the said advancing movement water under pressure is discharged upwardly through the spray jets 29 and the glasses are cleansed as they pass below the guard.

As the table completes its intermittent movement the inclined leading face of one the ratchet teeth 14' engages and depresses the inner end of the retaining pawl 33 so that the outer end of the latter is raised to clear the shoulder $32^2$ on the cam. Thus the spring 31 is free to return the valve 26 to its original position shown in Figure 6 and cut off the supply of water to the spray jets 29.

The waste water discharged through the spray jets and from the cylinder 19 is collected in the tray 10 and is discharged to waste through a suitable outlet 40 therein.

The cleansed glasses are drained while standing on the table 16 and when the latter is subsequently operated a sufficient number of times they return to the rear of the bar counter and are there removed.

It is important to note that the movements of the table 16 are effected by means of the compressed spring 24 so that the speed thereof is independent of variations in the pressure of the water employed to compress same. That is to say the table is stationary while pressure water is being supplied to the cylinder to move the plunger inwardly and compress the spring.

The modified and preferred construction illustrated in Figures 10 to 17 inclusive is generally similar to that described above and it is accordingly necessary to refer only to the differences in construction and arrangement.

In this construction the plunger 20 is a tight fit in the cylinder and the inner face of the cover plate 18 of the valve casing 12² is provided between the cylinder port 23 and the spray port 27 with a cylinder exhaust port 40 providing access to an exhaust passage 41 which discharges into the tray 10, an adjustable spring loaded valve 42 being provided to regulate the rate of flow of the liquid therethrough.

The valve 26 consists of a single radial member and same is provided in its inner face with a transverse slot 43 which in one position of the valve connects the cylinder port 23 to the exhaust port 40 as shown in Figures 12 and 15.

When this valve 26 is disposed in its normal position, shown in Figure 11, the cylinder port 23 is uncovered so that the outer end of the cylinder is normally full of water under pressure the plunger rod 20' being thus fully projected and the spring 24 compressed. Consequently, the apparatus is normally ready to operate immediately the control arm 31 is actuated.

When the control arm is raised to its operated position, the valve 26 is moved to the position shown in Fig. 12 so that the spray port 27 is uncovered while the cylinder and exhaust ports 23 and 40 respectively are both covered but are placed in communication with each other by means of the aforesaid slot 43 in the inner face of the valve.

Thus the compressed spring 24 forces the plunger towards the outer end of the cylinder and discharges the water therefrom through the exhaust passage 41, the rate of such movement being adjustable by the valve 42 to determine the rate at which water can escape from the cylinder.

The cam 32 is formed with a flat surface 32a which is normally in register with the weighted end of the pivoted retaining pawl 33 whereby the inner end of the latter is normally received in one of a plurality of equally spaced rectangular slots 44 in the periphery of the central disc 14 which supports the table 16, the lower portions of the following faces of such slots being bevelled as shown at 44'.

Thus when the pawl 33 is disposed in the described normal position, the table is restrained thereby against angular movements in either direction.

When, however, the control arm 31 is raised to its aforesaid operative position, the cam 32 is moved angularly into the position shown in Figure 12 so that the outer end of the pawl is raised while its inner end is correspondingly depressed to the position shown in that figure and it will be noted that same still projects upwardly into the coacting slot 44 in the disc 14 but the upper edge thereof is disposed below the vertical portion of the following face of the slot. Consequently, the pawl will still prevent retrograde movements of the table but will permit of forward movements thereof.

The cam 32 is temporarily retained in its aforesaid operative position by a retaining lever 45 which is pivoted intermediate its ends to the cylinder and the outer end of which is urged towards the periphery of the cam by a strip spring 46. Thus when the cam approaches its operated position, the said outer end of the retaining lever passes below a retaining shoulder 32b on the cam.

The inner end of the pivoted retaining arm 45 is formed with an inclined face 45' for engagement by an adjustable abutment screw 47 on the free end of the plunger rod 20' as the latter closely approaches the limit of its retracting movement under the influence of the spring 24 within the inner end of the cylinder. Thus as the plunger rod reaches the limit of its said movement, the retaining lever 45 is displaced sufficiently to release the cam 32 which then returns to its normal position under the influence of the control arm 31 which is weighted at its free end.

The said plunger rod 20' is preferably of square shape in cross section to prevent angular movements thereof and its free end is provided as in the construction previously described with an upstanding post in which a depressible spring loaded driving pawl 21 is slidably mounted.

The driving pawl is successively engageable with a plurality of radially disposed ratchet slots 46 formed in the lower face of the disc 14, each such slot being disposed in radial alignment with one of the peripheral slots 44 in the said disc.

The leading face of each slot 46 is disposed vertically while the following face thereof inclines rearwardly and downwardly to depress the driving pawl 21 when the latter is moved rearwardly by the plunger 20 that is when the latter is forced inwardly by the pressure fluid to perform its "idle" stroke.

Preferably provision is made whereby damage to the mechanism is avoided if the control arm 31 is forced towards its normal lowermost position, while the cam 32 is retained in its operated position by the pivoted retaining lever 45. Thus as shown in Figure 16 the control arm is pivoted to the outer end of the operating spindle 30 and the inner end of said arm is enlarged and formed with an interrupted recess 47 one end of which is defined by an integral driving abutment 31'.

This abutment 31' is normally maintained in engagement with a corresponding abutment 48 on the driving spindle by a compression spring 49 which, however, permits the control arm to be pressed downwards independently of the spindle 30 while the cam 32 is held in its operated position by the pivoted retaining lever 45.

It may also be mentioned that the wall of the valve chamber 12² is extended laterally by a laterally opposed pair of integral wing portions of which one, designated 12³, forms a split clamp for the cylinder 19, while the other 12⁴, is formed with a passage 34' by which water is supplied to the valve chamber from the supply pipe 34.

A perforated spray pipe 28 is arranged substantially radially below the table 16 and substantially diametrically opposite to the operating spindle 30 and a second perforated spray pipe 28' is arranged adjacent and parallel thereto. The outer ends of these spray pipes 28 and 28' project through the rim of the tray 10 and are connected together through a shut-off valve 50.

In addition the outer end of the pipe 28 is connected by a pipe 28a to the cold water inlet of a suitable type of pressure water heater shown diagrammatically at 51, while similarly the spray pipe 28' is connected by a pipe 28b provided with a shut-off valve 52 to the hot water outlet of the heater.

Accordingly, if cold water is supplied under pressure through the supply pipe 34, cold water is sprayed upwardly through the pipe 28, while either cold water or hot water is simultaneously sprayed upwardly through the pipe 28' according to whether the valve 50 or the valve 52 is open.

It will be noted also that in this modification the splash guard 35 extends above and around approximately one half of the circumference of the table.

From the foregoing description it will be understood that the weight of the control arm 31 normally maintains it in its lowermost position so that the valve 26 is in the position shown in Figure 11 with the cylinder port 23 uncovered and the spray port 27 covered.

The cylinder 19 is thus normally full of water under pressure so that the plunger rod 20' is fully projected and the driving pawl 21 thereon is engaged in one of the radial ratchet slots 46 in the lower face of the disc 14.

At this time the table 16 is restrained against movements in either direction by the inner end of the retaining pawl 33 which is received within the corresponding slot 44 in the periphery of the disc 14.

In order to operate the machine, the control arm 31 is moved to its uppermost position and is then released but same is retained in such position by the engagement of the pivoted retaining lever 45 with the shoulder 32b on the cam 32 which was moved in unison with the control arm to disengage the retaining pawl 33.

Also the operation of the control arm causes the valve 26 to be moved from the position shown in Figure 11 to that shown in Figure 12 so that the spray port 27 is uncovered while the cylinder port 23 is covered and connected to the exhaust port 40 by the by-pass slot 43 in the inner face of the valve.

Thus water under pressure passes to the spray pipes 28 and 28' while the plunger rod commences its outward operative stroke under the influence of the spring 24 within the cylinder and imparts a corresponding angular movement to the table 16 through the driving pawl 21.

As the plunger rod approaches the end of its outward stroke the abutment screw 47 thereon engages the inner end of the pivoted retaining lever 45 and displaces same in opposition to the associated spring whereby the cam 32 is released so that the weighted control arm 31 returns the cam and the valve to their normal positions.

Thus as the table is completing its angular movement the flat portion 32a of the cam moves into register with the outer end of the retaining pawl 33 so that the inner end of the latter moves upwardly into the adjacent slot 44 in the periphery of the disc 14 and so locks the table against further movement.

As the valve returns to its normal position the cylinder port 23 is again uncovered thereby so the plunger is forced inwards to the opposite end of its stroke thus compressing the spring 24 in preparation for the next cycle of operations. During this "idle" stroke of the plunger, the table is stationary as retrograde movement thereof is prevented by the retaining pawl 33.

Accordingly, at the commencement of the idle stroke of the plunger the driving pawl 21 is disengaged from the coacting radial slot 46 and slides rearwardly over the lower surface of the disc 14 until at the end of such stroke it enters the next succeeding slot so that the table will be constrained to move forwardly in unison with the plunger when the control arm 31 is again actuated.

Finally the valve 26 in returning to its normal position again covers the spray port 27 so that the discharge of liquid through the spray pipes 28 and 28' is terminated.

I claim:

1. Apparatus for cleansing drinking glasses and the like comprising a table of openwork construction adapted to support a plurality of inverted drinking glasses, means supporting the table for rotation about a substantially vertical axis, liquid spray means arranged between loading and unloading stations of the table, a single acting reciprocable hydraulic motor, means operable during each fluid receiving stroke of the motor to store energy for the return stroke thereof, means operable during each alternate stroke of the motor to impart a corresponding limited angular movement to the table and control means operable manually to cause said motor to undergo one cycle of two successive strokes.

2. Apparatus for cleansing drinking glasses and the like comprising a table of openwork construction adapted to support a plurality of inverted drinking glasses, means supporting the table for rotation about a substantially vertical axis, liquid spray means arranged between loading and unloading stations of the table, a single acting reciprocable hydraulic motor, resilient means operable during each fluid receiving stroke of the motor to store energy for the return stroke thereof, transmission means interconnecting said motor and said table to impart a predetermined angular movement to the latter during each said return stroke of the motor and control means operable manually to cause said motor to undergo one cycle of two successive strokes.

3. Apparatus for cleansing drinking glasses and the like comprising a substantially horizontal table of openwork construction adapted to support a plurality of inverted drinking glasses, means supporting said table for rotation about a substantially vertical axis, liquid spray means arranged between loading and unloading stations of the table, a single acting reciprocable hydraulic motor, resilient means operable during each liquid receiving stroke of the motor to store energy for the return stroke thereof, transmission means interconnecting said motor and said table to impart a predetermined angular movement to the table during each said return stroke of the motor, means operable to restrain the table against angular movements during each liquid receiving stroke of the motor, valve means operable to direct a cleansing liquid under pressure to said spray means during each angular movement of the table and control means operable manually to cause said motor to undergo two successive strokes.

4. Apparatus for cleansing drinking glasses and the like comprising a substantially horizontal table of openwork construction adapted to support a plurality of inverted drinking glasses, means supporting said table for rotation about a substantially vertical axis, upwardly directed liquid spray means arranged below the table and between loading and unloading stations thereof, a single-acting reciprocable hydraulic motor, means operable during each fluid-receiving stroke of the motor to store energy for the return stroke thereof, means operable during each alternate stroke of the motor to impart a predetermined angular movement to the table, valve means operable to direct liquid under pressure from a common source thereof to said hydraulic motor and said spray means and control means operable manually to actuate said valve to cause said motor to undergo two successive strokes and to cause said liquid to be discharged from said spray means while the table is undergoing its angular movement.

5. Apparatus for cleansing drinking glasses and the like comprising a dished liquid collecting tray, a substantially horizontal table arranged above the tray and adapted to support a plurality of inverted drinking glasses, means supporting said table for intermittent rotation about a substantially vertical axis, upwardly directed spray means arranged below the table and between loading and unloading stations thereof, a single acting hydraulic motor arranged below the table, resilient means operable during each liquid receiving stroke of the motor to store energy for the return stroke thereof, pawl and ratchet driving means interposed between said motor and said table whereby an angular movement of predetermined extent is imparted to the table during each said return stroke of the motor, means operable to restrain the table against rotation during each liquid receiving stroke of the motor, valve means operable to direct liquid under pressure from a common source thereof to said motor and said spray means alternately, control means operable manually to displace said valve means from the normal to the operated position thereof to effect actuation of said motor and means operable to prevent the return of said valve means to said normal position thereof until the motor completes two successive strokes.

6. Apparatus for cleansing drinking glasses and the like comprising a dished liquid collecting tray, a substantially horizontal table arranged above the tray and adapted to support a plurality of inverted drinking glasses, means supporting said table for intermittent rotation about a substantially vertical axis, upwardly directed spray means arranged below the table and between loading and unloading stations thereof, a single acting hydraulic motor arranged below the table, resilient means operable during each liquid receiving stroke of the motor to store energy for the return stroke thereof, a reciprocable plunger rod projecting from said motor, ratchet means rigidly associated with the table, a driving element on the plunger rod to coact with said ratchet means and adapted to impart a predetermined angular movement to the table during each said return stroke of the motor, means operable to restrain the table against rotation during each said liquid receiving stroke of the motor, valve means movable angularly between spaced normal and operated positions thereof to direct a pressure liquid alternately to said motor and said spray means, a manually operable control member for said valve means, means operable to retain said valve means temporarily in the operated position thereof and means operable when said motor completes two successive strokes to release said valve retaining means and permit said valve means to return to the normal position thereof.

7. Apparatus for cleansing drinking glasses and the like according to claim 6 including means forming a valve chamber accommodating said valve means, a seating in said valve chamber and engaged by said valve means said seating having a cylinder port communicating with the hydraulic motor and a spray port spaced from the cylinder port and communicating with said spray means said cylinder port being uncovered and said spray port covered by said valve means when the latter is disposed in its said normal position.

8. Apparatus for cleansing drinking glasses and the like comprising a fixed circular tray having an upstanding rim portion and provided with a discharge outlet, a horizontal circular table of openwork construction arranged coaxially above the tray and adapted to support a plurality of inverted drinking glasses, means upstanding from the center of the tray and supporting the table for rotation about a vertical axis, at least one spray discharge pipe arranged below the table and between loading and unloading stations thereof to direct a cleansing liquid upwardly onto vessels supported on the table, a single acting hydraulic motor cylinder arranged below the table and fixed relatively to the tray, a slidable plunger in the cylinder, a plunger rod secured to the plunger and projecting from the cylinder, ratchet means on the table, a driving element on said plunger rod and coacting with said ratchet means, a valve chamber arranged to be connected to a source of liquid under pressure, said valve chamber being fixed relatively to the tray and disposed below the table, a valve seating in said valve chamber and having therein a spaced pair of ports one of which communicates with one end of said cylinder while the other communicates with said spray pipe, a valve member arranged within said valve chamber in engagement with said seating and movable angularly between a normal position and an operated position thereof to cover and uncover said ports alternately, a compression spring disposed coaxially with the plunger and arranged to be compressed during each liquid receiving stroke of the motor to store energy for the return stroke thereof, control means operable manually to displace said valve member from its normal position to its operated position, means biassing said valve means towards said normal position thereof, means operable to prevent the return of said valve means to said normal position thereof and means operable to release said retaining means when the plunger completes two successive strokes in response to the operation of said control means.

9. Apparatus for cleansing drinking vessels and the like according to claim 8 wherein said valve seating is provided with a further port communicating with an exhaust passage and wherein said valve means is provided with a by-pass passage which connects said exhaust port to the port leading to the cylinder when said last mentioned port is covered by said valve means.

10. Apparatus for cleansing drinking vessels comprising a horizontal table of openwork construction supported for rotation about a vertical axis and adapted to support a plurality of inverted drinking vessels, a single acting hydraulic motor arranged below the table, said motor comprising a cylinder, a slidable plunger therein and a plunger rod projecting from one end thereof, pawl and ratchet means interconnecting said plunger rod and said table whereby the latter is moved angularly when the plunger rod is displaced in one direction, a first retaining means operable to restrain the table against rotation while the plunger is moving in the opposite direction, at least one upwardly directed spray pipe arranged below the table and between loading and unloading stations thereof, a valve chamber adapted to be connected to a source of liquid under pressure, a seating in said valve chamber and having therein a spaced pair of ports connected respectively to said spray pipe and to one end of the cylinder, a compression spring arranged within the other end of the cylinder to effect the return stroke of the plunger therein, a valve member arranged within said valve chamber in contact with said seating therein and adapted to cover and uncover said ports alternately, said valve member being movable angularly between a normal position and an operated position thereof, control means operable manually to move said valve member from said normal position to said operated position, means biassing said control means and said valve means towards their normal positions, a cam movable in unison with said valve means and arranged to release said first restraining means when said control means is moved to its operated position, a second retaining means coacting with said cam to prevent the return of said valve means to the normal position thereof and means operable to release said cam retaining means when the motor completes two successive strokes in response to operation of said control means, said pawl and ratchet means being operable to move the table angularly during each return stroke of the plunger of the motor under the influence of said compression spring.

11. Apparatus for cleansing drinking glasses and the like according to claim 10 wherein said cylinder port is uncovered and said spray port is covered when said valve member is disposed in its normal position.

12. Apparatus for cleansing drinking vessels according to claim 10 wherein said valve seating is provided between said spray port and said cylinder port therein with an exhaust port communicating with a restricted exhaust passage and wherein said valve member is formed in its inner face with a by-pass passage which connects said cylinder and exhaust ports when the valve member is disposed in its operated position.

13. Apparatus for cleansing drinking vessels according to claim 10 including means for heating liquid under pressure, a second spray pipe arranged below the table and connected at one end to the outlet of said heating means and wherein the outer end of said first mentioned spray pipe is connected to the inlet of said heating means.

14. Apparatus for cleansing drinking vessels according to claim 10 wherein said cam retaining means comprises a pivoted arm, means urging said arm into contact with the cam, a retaining shoulder on the cam for engagement by said arm when the valve member is disposed in its said operated position and coacting means on said plunger rod and pivoted arm to displace the latter and release the cam as the plunger rod completes its return stroke.

15. Apparatus for cleansing drinking glasses and the like comprising a fixed circular tray having an upstanding rim portion and provided with a discharge outlet, a horizontal circular table of openwork construction arranged coaxially above the tray and adapted to support a plurality of inverted drinking glasses, means supporting the table for rotation about a vertical axis, at least one spray discharge pipe arranged below the table and between loading and unloading stations thereof to direct a cleansing liquid upwardly therethrough, a single acting hydraulic motor arranged below the table and comprising a cylinder, a slidable plunger therein and a plunger rod projecting from the cylinder, ratchet means secured to the table, a driving element on said plunger rod for coacting engagement with said ratchet means, a valve chamber arranged to be connected to a source of liquid under pressure, a valve seating therein, a valve member engaging said seating and movable angularly between a normal position and an operated position thereof, said seating being provided with a spaced pair of ports one of which communicates with one end of said cylinder while the other communicates with said spray pipe, resilient means arranged to be strained during each liquid receiving stroke of the motor, control means connected to said valve member and operable manually to displace the latter from its normal position to its operated position, means biassing said valve means towards said normal position thereof, retaining means operable to arrest said valve means at an intermediate position as same is returning to its normal position and means operable to release said retaining means when the plunger completes two successive strokes in response to the operation of said control means, said valve means being adapted to cover both ports when disposed in its normal position, to cover said spray port and expose said cylinder port when same is disposed in said operated position and to cover said cylinder port and expose said spray port when disposed in said intermediate position.

GERALD ARTHUR STANLEY.

REFERENCES CITED

The following references are of record in the file of this patent:

UNITED STATES PATENTS

| Number | Name | Date |
| --- | --- | --- |
| 822,568 | Anderson | June 5, 1906 |
| 1,780,772 | Washburne | Nov. 4, 1930 |
| 2,082,285 | Greer | June 1, 1937 |
| 2,122,018 | Wolf | June 28, 1938 |
| 2,151,437 | Ohme | Mar. 21, 1939 |